Jan. 27, 1953  H. C. CUSKIE  2,626,797
AUTOMOTIVE VEHICLE STABILIZING MEANS
Filed April 2, 1949   3 Sheets-Sheet 1

INVENTOR.
Herman C. Cuskie.
BY
Harness and Harris
ATTORNEYS.

Jan. 27, 1953　　　　　H. C. CUSKIE　　　　　2,626,797
AUTOMOTIVE VEHICLE STABILIZING MEANS
Filed April 2, 1949　　　　　　　　　　　　3 Sheets-Sheet 2

INVENTOR.
Herman C. Cuskie.
BY
Harness and Harris
ATTORNEYS.

Jan. 27, 1953   H. C. CUSKIE   2,626,797
AUTOMOTIVE VEHICLE STABILIZING MEANS
Filed April 2, 1949   3 Sheets-Sheet 3

INVENTOR.
Herman C. Cuskie.
BY
Harness and Harris
ATTORNEYS.

Patented Jan. 27, 1953

2,626,797

UNITED STATES PATENT OFFICE 2,626,797

AUTOMOTIVE VEHICLE STABILIZING MEANS

Herman C. Cuskie, Birmingham, Mich., assignor to Chrysler Corporation, Highland Park, Mich., a corporation of Delaware Application April 2, 1949, Serial No. 85,115

31 Claims. (Cl. 267—11)

This invention relates to automotive vehicles and more particularly to the improvements in stabilizing or anti-sway means for bodies of such vehicles.

An object of the invention is to provide an efficient and low cost stabilizing means which is especially adapted for vehicles having independently sprung ground wheels.

Another object of the invention is the provision of stabilizing means as aforesaid, which when employed in association with steerable ground wheels does not interfere with or restrict steering movement of such wheels and thus makes possible a shorter turning radius for the vehicle.

A yet further object is to provide a stabilizer for vehicles characterized by independent wheel suspensions such as may be mounted altogether free of the sprung portions, or load-carrying supported parts of the vehicle, and supported and carried solely by the unsprung portions, or parts supporting the load-carrying supported parts of the vehicle.

A yet further object is the provision of a stabilizer suitable for opposed independent wheel suspensions such that the rate of the load springs is not interfered with in their resilient suspension function yet a stabilizing tendency is ever in existence owing to the presence and strategic location of the stabilizer bar.

Yet another object is to provide a simple stabilizer bar formed of one integral piece of material in which no joints or immediate connections need be provided. According to a feature of this invention the lateral portions of the stabilizer bar are received in rubber blocks carried by the lower control arms of each suspension so as to be rotatably and axially free for shift throughout their entire length along the arms.

A further object of the invention is to provide a stabilizer bar of one piece construction which is axially shiftable in a fashion able to compensate for structural adjustments and able to move relative to the support by a means carrying it so as to have at no portion a rigid connection therewith.

A still further object is the provision of stabilizing means in the form of a torsion bar structure which in association with independent wheel suspensions having the foregoing advantages will readily accommodate the installation and removal of a lifting jack.

For the carrying out of the invention in conjunction with the independent wheel suspension including upper and lower link members connected at their outer ends by a wheel-carrying structure, there is preferably provided a torsion bar for the oppositely disposed suspensions having the main body thereof disposed transversely of the vehicle frame and with the lateral ends thereof located immediately adjacent the associated lower link member and rotatably associated with the latter member. Each of said lateral ends is preferably rotatably connected by an insulating bushing or cushion with the associated lower link member along a side of the latter.

Other objects and advantages of the invention reside in the novel combination and arrangement of parts as will be more apparent from the following description taken in connection with the accompanying drawings in which.

Figure 1:
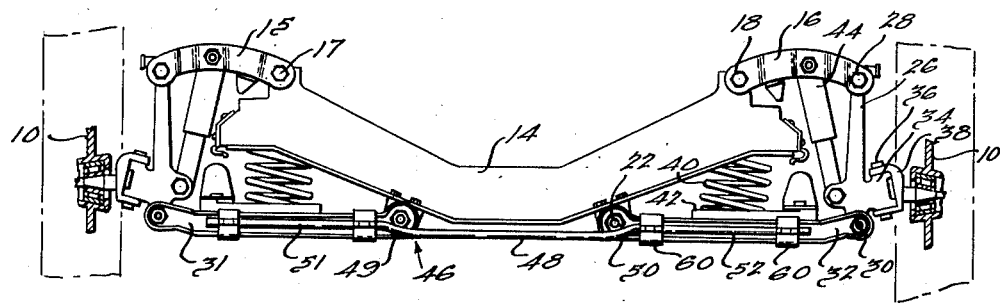
Figure 1 is a front elevational view of a typical automotive vehicle construction having the invention applied thereto.
Figure 2:
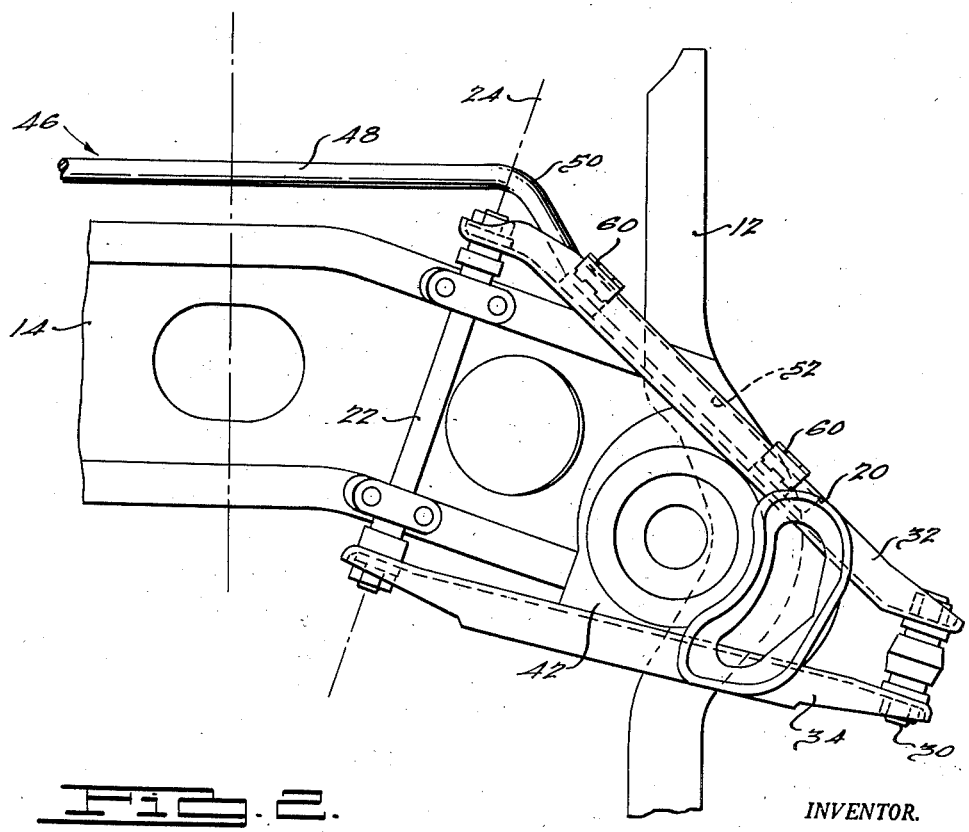
Figure 2 is a bottom plan view of a portion of the vehicle construction appearing in Figure 1.

In reference to Figures 1 and 2, the invention is shown in connection with front steerable ground wheels 10 disposed opposite each other at the sides of a frame structure including the longitudinally extending side rail 12 and front cross member 14 which is adapted to support the body structure in the conventional manner.

The frame structure is supported on the wheels 10 by a system of independent suspensions one for each wheel, the illustrated suspension including the upper link members 15 and 16 and the lower link members 31 and 32. For the sake of brevity, the structure associated with members 16 and 32 only will be described. Member 32 is pivoted at 22 to the frame structure and member 16 is pivoted at 18 to the frame structure. A swinging movement is thereby provided for these two members 16 and 32 relative to the frame cross member 14. The members 16 and 32 may be of the usual wishbone type and extend laterally outwardly and rearwardly of the vehicle for connection at their outer ends with the generally upright wheel-carrying knuckle support arm 26, which is articulated at 28 and 30 with the upper and lower link members respectively. The lower link member includes a pair of arms 32 and 34 channel-shaped in cross section and opening away from each other. Members 32 and 34 are adapted to swing about the pivot axis 24 defined by pivot 22, which is disposed generally longitudinally of the automotive vehicle frame.

The upright arm 26 may carry a knuckle portion 34 having the usual king pin 36 for swiveling the companion knuckle portion 38 of the associated wheel 10 and thereby accommodating steering movement of the wheels in the well-known manner. A load spring 40 acts between the frame member 14 and a seat 42 supported by the lower link member to support yieldingly the weight of the frame structure on the ground wheels.

The independent wheel suspension accommodates rising and falling movement of each ground wheel 10 relative to the frame structure independently of the remaining ground wheels of the vehicle, the link members 16 and 32 maintaining the associated arm 26 in the desired upright position. Suitable shock absorbing means indicated at 44 may be associated with each wheel suspension as desired.

The stabilizing means is provided by a torsion bar assembly 46 which includes a main body portion 48. This body portion will be observed to lie normally in a substantially horizontal plane vertically displaced from the horizontal plane containing pivot 22. Predetermined crooks or bends 49 and 50, located as seen in Figure 2 substantially at the intersection of the bar assembly 46 with a vertical plane through the pivotal axis of the respective adjacent arm members, for instance the axis 24 of the pivot 22 for the arm member 32 in the case of the bend 50, are provided at either end of body portion 48 from which lateral portions 51 and 52 of the stabilizer bar extend. These lateral portions normally occupy a horizontal plane but slightly vertically displaced from the horizontal plane occupied by body member 48. The bar assembly 46 is preferably of a uniform cross section and of a resilient torsional elastic construction. It will be observed that lateral portions 51 and 52 lie along arms 31 and 32 in an associated journalled relation but are otherwise free from connection with the automotive vehicle. A hinge device is indicated at 60 which provides for a connection of lateral portion 52 with arm 32 as is about to be set forth more in detail.

Figure 3:
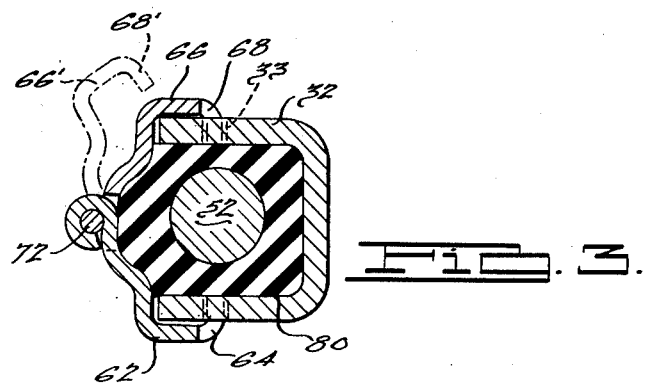
Figures 3 and 4 are respectively a cross-sectional view and an exploded view of the cushion members for the stabilizing bar and their associated retaining structure.
Figure 4:
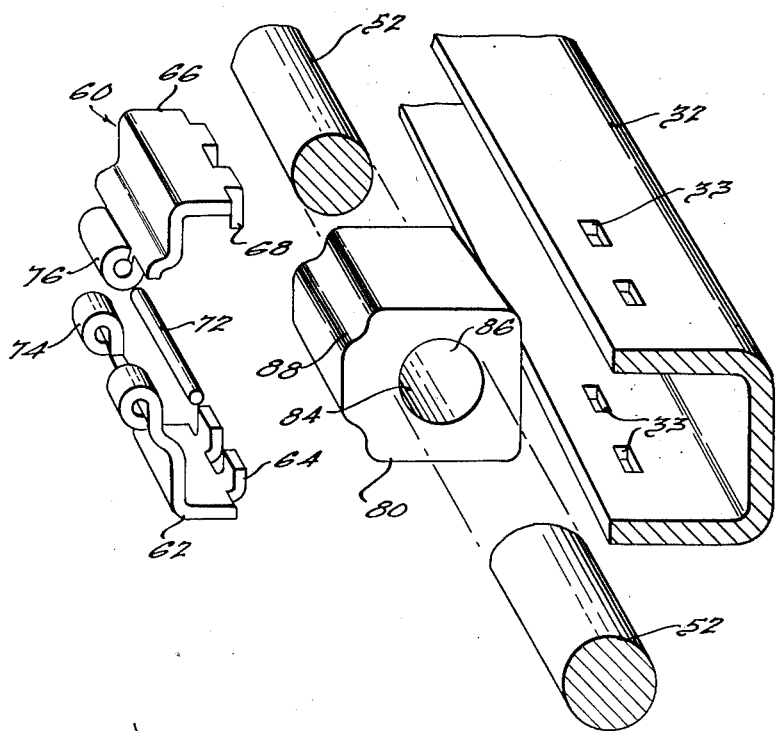

As regards Figures 3 and 4, the hinge device 60 is shown respectively in a cross section view and in an exploded view for the purpose of illustrating its relation to the suspension arm 32. Hinge device 60 comprises a body portion of which the lower half is indicated as at 62 to have lugs 64 adapted to project at an angle therefrom. Upper half 66 may be provided with corresponding lugs 68 which are deformed at an angle thereto. These lugs 64 and 68 are adapted to be received in complemental holes 33 provided in the opposed walls of the channeled section member 32. Portions 74 and 76 of the hinge device are adapted to receive a pintle or pin 72 in order to provide for relative swinging motion between the upper and lower halves 62 and 66. For attachment to the channeled member 32, as will be noted particularly in Figure 3, the lower lugs 64 may be received in the lower wall of the channel whereupon the upper half from a position 66' may be snapped over onto the upper wall of the channel section and lugs 68 received in their proper apertures. To be secured by these retainers in channel section 32 are cushions such as at 80 which are provided with an inner surface 84 defining an aperture 86 for intimately receiving the lateral portion 52 of member 46.

Cushion 80 may be formed with a suitable curved surface 88 along its exposed face for receiving the portion of the hinge device adjacent the hinge pin 72. Rubber or rubber-like material is preferably employed for use as cushion 80 for reason that its hardness characteristic may be easily controlled and its resilience readily predetermined by familiar methods although other suitable materials and compositions may conceivably be used. According to the showing of Figure 4, cushion 80 is represented as being of a width of the order of retainer 60. Actually cushion 80 may be of an extended width so as to lie along a considerable portion of member 32 and be attached at suitable intervals by the necessary retainers. Again, cushion 80 may be provided at spaced intervals in any numbers as desired along the channel-shaped member 32 and attached by the retainers as appropriate. As borne out, however, by Figure 2, lateral portion 52 of the stabilizer 46 is cushioned to link 32 in at least two spaced points thereon, one point being relatively near axis of oscillation 24 for link 32, and the other point being relatively remote to that axis. This spacing of the points of support provides for a desirable differential movement and allows one point greater relative motion than the other in regard to the vehicle frame. It will be observed, moreover, that the cushion points for lateral arm 52 are not transversely aligned as respects the longitudinal axis of the vehicle body but rather are disaligned as respects this axis and, as shown, are disaligned respecting axis of oscillation 24. Thus movement of link 32 will not only impart a bending action to the stabilizer 46 but also by virtue of the transverse disalignment just described will subject the stabilizer to a torsion moment which when transmitted through crook portion 50 will be translated into practically pure torsional stress in the body portion 48. It is to be appreciated, of course, that if the points of attachment for lateral arm 52 to link 32 lay in a line substantially normal to the longitudinal axis of the vehicle, the stabilizer bar 46 would be subjected solely to bending and the desirable torsional stresses which are of benefit in supplying a righting moment to the vehicle would be lacking.

Figure 5:
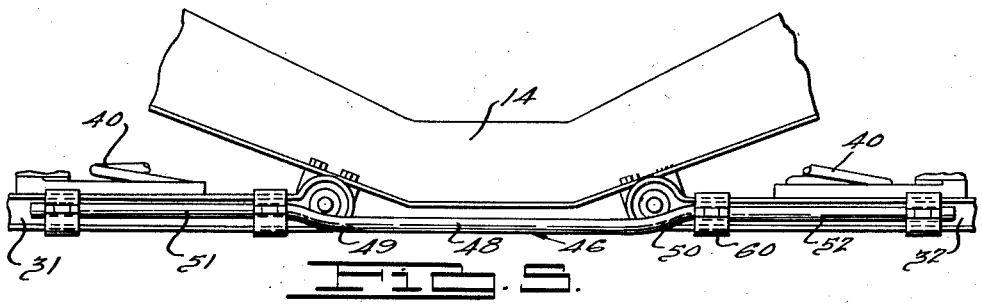
Figures 5, 6, and 7 are views illustrative of an operating sequence typical of the invention as applied.
Figure 6:
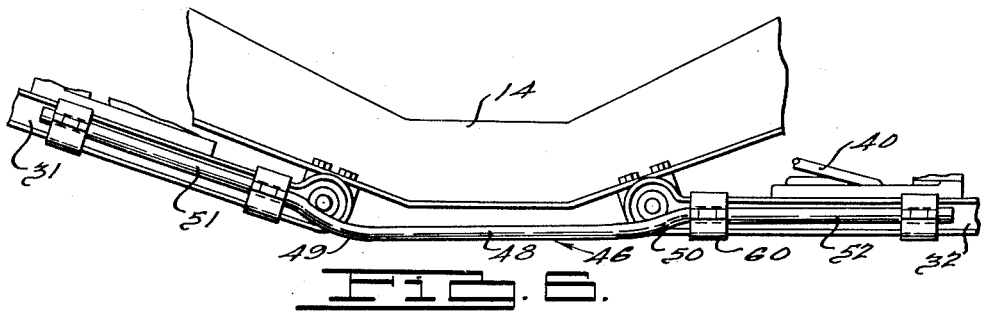
Figure 7:
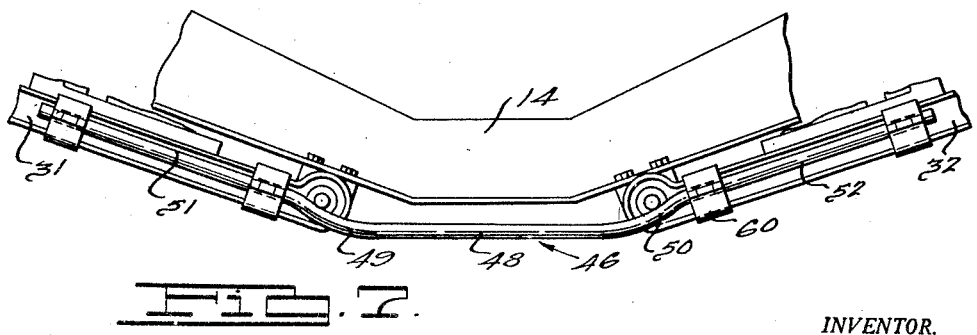

As to operation of the member 46, reference may be had to sequential Figures 5, 6, and 7. In Figure 5 member 46 is represented as occupying its normal position whereof though each of the individual portions 48, 51, 52 lies in a substantially common horizontal plane, enough offset is provided between the respective portions to afford such access to the pivot joints for the lower control arms of the suspension as may be necessary. Lateral portions 51 and 52 are held by means of the hinge devices 60 to arms 31 and 32 respectively although clamped to a cushioned mounting such as the aforementioned rubber-like blocks 80 will provide. The result of a relatively rising motion of arm 31 is illustrated in Figure 6. Rising naturally with arm 31 will be the cushioned lateral portion 51 of member 46. Displacement of portion 51 will be reflected in that a combined torsional and bending stress will be set up and transferred along member 46 to the crook portion 49 adjacent the pivotal axis of oscillation of the arm 31 and thereafter transmitted to the body portion 48. Inasmuch as lateral portion 51 is free to twist relative to arm 31 as well as have any compensating axial shift thereto, the stresses set up in body portion 48 will be reduced practicably to the form of pure torsion. By an inverse process this practicably pure torsion set up in body portion 48 will be transmitted to lateral arm 52 with the effect that arm 32 is urged upwardly virtually to duplicate the movement of arm 31. The torsion stresses in body portion 48 are, of course, relieved so soon as arms 31 and 32 are disposed in the same relative positions as shown in Figure 7. Thus if the automotive vehicle should strike a rut or a rise which simultaneously effects both of the opposed wheels at the same time and in the same direction of movement, there would be no appreciable stresses in member 46 at all and the load springs such as at 40 of the car would operate unhindered either as to assistance or handicap of their normal spring rate. By way of return to Figure 6 particularly, the function of member 46 in its stabilizing capacity is as contrasts with its load spring effect, of a directly manifest character. When arm 31 is subjected to a rising motion, the reaction of arm 32 is such as to urge through the medium of member 46 the member 31 to resume its nondisplaced position. Thus if the vehicle is so rounding a curve that arm 31 is displaced toward the frame such that its angularity therewith decreases, the arm 32 will in the normal course of event either remain at the same angularity as that shown in Figure 6 or else at a greater angularity to frame member 14. The substantially pure torsion force in body portion 48 of member 46 thereupon will act in an effort to urge the relative separation of arm 31 from the automotive vehicle frame and increase the relative angularity thereof to a value comparable to the angularity of arm 32. The net effect of this transmission of torsion force is to supplement the action of load spring 40 associated with arm 31 and in effect to increase the rate of the spring for the purposes of the stabilizing action. Hence the vehicle body will be subjected to a righting moment such as of advantage in overcoming the sway of the vehicle body as will be encountered, for example, in negotiating a curve.

It is to be particularly emphasized in this highly satisfactory stabilizing assembly that albeit the spring rate of the load spring being subjected to an additional load due to the turning action of the vehicle body in negotiating a curve is effectively increased, the spring rate of neither load spring 40 disposed on the opposite sides of the automotive vehicle is increased when both suspensions are subjected simultaneously to a corresponding rise or simultaneously to a corresponding falling movement.

While there is a connection between lateral portion 51 and arm 31 on the one hand, and lateral portion 52 and arm 32 on the other, this connection is not a rigid or fixed connection at all and the resiliency of the rubber-like cushions affords ample shift as is necessary between the cooperating members so long as their longitudinal coincidence does not vary. It will be readily perceived that member 46 could be applied to the rear link 34 in place of the front link 32 of the lower control arm or conceivably could be applied to one or the other of the links of the upper control arms 15 and 16. Furthermore, the invention may be utilized in connection with the rear or non-steering road wheels of the vehicle instead of or in addition to the front or steering wheels as illustrated. In any case, each bar 46 will be associated only with one pair of oppositely disposed swinging arms of the vehicle suspension and otherwise free of the vehicle. Further connection with the frame or with the suspension is not only unnecessary but undesirable.

Bar 46 is preferably of a uniform cross section and of the linkless or one piece type. Although the invention has been described in connection with a specific embodiment, the principles involved are susceptible of numerous other applications which will readily occur to persons skilled in the art. Therefore, various modifications and changes will become apparent from the teachings of my invention and it is to be understood that the invention is not to be limited to the particular details of construction and mode of operation shown and described herein for illustrative purposes.

What is claimed is:

1. In combination, a longitudinal vehicle frame, an individual wheel suspension at each side of the frame and each including a lateral arm connected to the frame for swinging movement about an axis lying substantially longitudinally respecting the frame, the axis of oscillation of one lateral arm being disposed in the horizontal plane containing the axis of oscillation of the other said lateral arm, resilient bar means extending transversely of the frame and comprising lateral outer end portions, a first means of rubber-like material connecting each of said end portions to a location on each said lateral arm adjacent its axis of oscillation, and a second means of rubber-like material connecting each of said end portions to another location on said arm remote to its axis of oscillation, said locations being in predetermined transverse disalignment as respects said longitudinal frame.

2. In combination, a longitudinal vehicle frame, an individual wheel suspension at each side of the frame and each including a lateral arm connected to the frame for swinging movement about an axis lying substantially longitudinally respecting the frame, the axis of oscillation of one lateral arm being disposed in the horizontal plane containing the axis of oscillation of the other said lateral arm, resilient bar means extending transversely of the frame and comprising lateral outer end portions, a first means connecting each of said end portions to a location on each said lateral arm adjacent its axis of oscillation, and a second means connecting each of said end portions to another location on said arm remote to its axis of oscillation, said locations being in predetermined transverse disalignment as respects said longitudinal frame, said resilient bar means being free from any controlling connection with other parts of the vehicle and comprising a linkless type stabilizer bar disposed to lie in substantial juxtaposition to said horizontal plane, said first and second means including at least two discrete bushing bodies coaxial with and embracing said stabilizer bar for accommodating axial and rotational movement thereof.

3. In combination, a longitudinal vehicle frame, an individual wheel suspension at each side of the frame and each including a lateral arm connected to the frame for swinging movement about an axis lying substantially longitudinally respecting the frame, the axis of oscillation of one lateral arm being disposed in the horizontal plane containing the axis of oscillation of the other said lateral arm, resilient bar means extending transversely of the frame and comprising lateral outer end portions, a first means of rubber-like material connecting each of said end portions to a location on each said lateral arm adjacent its axis of oscillation, and a second means of rubber-like material connecting each of said end portions to another location on said arm remote to its axis of oscillation, said locations being in predetermined transverse disalignment as respects said longitudinal frame, said resilient bar means being free from any controlling connection with parts of the vehicle other than through said arms.

4. In a vehicle comprising a longitudinal sprung portion and a pair of oppositely disposed road wheels, suspensions for the wheels accommodating rising and falling movement of one independently of the other, each of which suspensions includes upper and lower arms connected with said sprung portion for oscillatory movement relative thereto in conjunction with the aforesaid wheel movement and a generally vertically disposed member connecting said arms, the respective axes of oscillation being substantially horizontal and substantially longitudinal of the sprung portion, a plurality of cushioning bodies of rubber-like material, said cushioning bodies being each provided with a through aperture and attached to a pair of arms one each constituting a certain arm of each suspension, and unitary bar-like stabilizer means extending between said suspensions and having lateral portions embraceably received in the apertures of said cushioning bodies and capable of rotative movement relative to said certain arms, said cushioning bodies accommodating said rotative movement and facilitating resilient movement of said stabilizer means with said certain arms, said stabilizer means being free from any controlling connection with other parts of the vehicle.

5. In a vehicle comprising a sprung portion and a pair of oppositely disposed road wheels, suspensions for the wheels accommodating rising and falling movement of one independently of the other, each of which suspensions includes upper and lower arms connected with said sprung portion for oscillatory movement relative thereto in conjunction with the aforesaid wheel movement and a generally vertically disposed member connecting said arms, the respective axes of oscillation being substantially horizontal, a plurality of cushioning bodies, said cushioning bodies being each provided with a through aperture and attached to a certain arm of each suspension, and stabilizer means embraceably received in the apertures of said cushioning bodies for resilient movement with each said certain arm and to be rotatable relative thereto, said stabilizer means being free from any controlling connection with other parts of the vehicle, and comprising a linkless type stabilizer bar extending transversely of said sprung portion and comprising a midportion and lateral end portions for the above described reception in said cushioning bodies which end portions are disposed at an obtuse angle to said midportion where they are embraced by said cushioning bodies.

6. In a vehicle having a longitudinal axis and comprising a sprung portion and a pair of oppositely disposed road wheels, suspensions for the wheels accommodating rising and falling movement of one independently of the other, each of which suspensions includes upper and lower arms connected with said sprung portion for oscillatory movement relative thereto in conjunction with the aforesaid wheel movement and a generally vertically disposed member connecting said arms, the respective axes of oscillation being substantially horizontal, a plurality of cushioning bodies of rubber-like material, said cushioning bodies being each provided with a through aperture and attached to a certain arm of each suspension, and stabilizer means embraceably received in the apertures of said cushioning bodies for resilient movement with each said certain arm and to be rotatable relative thereto, said stabilizer means being free from any controlling connection with other parts of the vehicle, and comprising a linkless type stabilizer bar extending transversely of said sprung portion and comprising lateral end portions for the above described reception in said cushioning bodies, said bodies providing attachment for the stabilizer bar in at least two mutually displaced points on each said certain arm, each of said two points being longitudinally spaced respecting the other along the vehicle and of a predeterminedly different spacing from the longitudinal axis of the vehicle.

7. In a vehicle comprising a sprung portion having a longitudinal axis and a pair of oppositely disposed road wheels, suspensions for the wheels accommodating rising and falling movement of one independently of the other, each of which suspensions includes upper and lower arms connected with said sprung portion for oscillatory movement relative thereto in conjunction with the aforesaid wheel movement and a generally vertically disposed member connecting said arms, the respective axes of oscillation being substantially horizontal, a plurality of cushioning bodies of rubber-like material, said cushioning bodies being each provided with a through aperture and attached to a certain arm of each suspension, and stabilizer means embraceably received in the apertures of said cushioning bodies for resilient movement with each said certain arm and to be rotatable relative thereto, said stabilizer means being free from any controlling connection with other parts of the vehicle other than said arms, and comprising a linkless type stabilizer bar extending transversely of said sprung portion and comprising lateral end portions for the above described reception in said cushioning bodies, there being a pair of said cushioning bodies provided on each said certain arm, the said bodies on each arm being spaced longitudinally and transversely of said axis of the sprung portion.

8. In combination, a vehicle frame, an individual wheel suspension at each side of the frame and each including a laterally extending arm pivoted to the frame for swinging movement about a substantially horizontal axis extending longitudinally of the frame, a stabilizer element extending laterally of the frame and including resilient end portions and spring-like means resiliently mounting said end portions to said arms respectively for relative rotative movement of the end portions thereto, said element being otherwise unconnected with the parts of the vehicle.

9. In combination, a vehicle frame, an individual wheel suspension at each side of the frame and each including a laterally extending arm pivoted to the frame for swinging movement about a substantially horizontal axis extending longitudinally of the frame, a stabilizer element extending laterally of the frame and including a resilient end portion in juxtaposition to each said arm, and mounting means securing said element to said arms, said mounting means including resilient means bonded to said end portions, said element being otherwise unconnected with the parts of the vehicle and comprising a unitary bar including a torsionally active body portion operable to resist relative rising and falling motion of one said arm in its swinging movement relative to the other said arm, and said resiliently bonded end portions being adapted to accommodate the foregoing motion by appropriate movement including endwise shift bodily along said arms and rotative movement relative thereto.

10. In combination, a vehicle frame, an individual wheel suspension at each side of the frame and each including a laterally extending arm pivoted to the frame for swinging movement about a substantially horizontal axis extending longitudinally of the frame, a linkless type stabilizer bar disposed transversely of said frame and having opposite ends in juxtaposition to said arms, and means journalling said ends to said arms, said stabilizer bar being free from connection with said frame.

11. In combination, a vehicle frame, an individual wheel suspension at each side of the frame and each including a laterally extending arm pivoted to the frame for swinging movement about a substantially horizontal axis extending longitudinally of the frame, a resilient bar extending laterally of the frame and having end portions of substantial length extending along the respective arms, and means for supporting each of said end portions on its arm for relative rotational movement whereby the axis of such end portion remains substantially in fixed position relative to the arm as the latter swings about its pivot, said bar being otherwise free from connection with the parts of the vehicle.

12. In combination, a vehicle frame, an individual wheel suspension at each side of the frame and each including a laterally extending arm pivoted to the frame for swinging movement about a substantially horizontal axis extending longitudinally of the frame, a linkless type stabilizer of substantially uniform cross section, said stabilizer comprising a pair of arcuate portions each disposed to form a reverse curve adjacent an arm pivot, a relatively straight body portion slightly vertically offset from and intermediately connecting said pair for accommodating torsional movement therebetween and being disposed transversely of the frame, and straight end portions disposed one along each arm and forming a continuation of one of said pair of arcuate portions to lie laterally thereof and oblique to the straight body portion, each said straight end portion being so carried by the arm between the outer end and pivot thereof as to substantially conform to the motion of the latter only in the respect that the longitudinal axis of the straight end portion does not substantially shift in inclination relative to the arm.

13. In combination, a vehicle frame, an individual wheel suspension at each side of the frame and each including a laterally extending arm pivoted to the frame for swinging movement about a substantially horizontal axis extending longitudinally of the frame, a linkless type stabilizer of substantially uniform cross section, said stabilizer comprising a pair of arcuate portions each disposed to form a reverse curve adjacent an arm pivot, a relatively straight body portion slightly vertically offset from and intermediately connecting said pair for accommodating torsional movement therebetween and being disposed transversely of the frame, and substantially straight end portions disposed one along each arm and forming a continuation of one of said pair of arcuate portions to lie laterally thereof and oblique to the straight body portion, each said straight end portion being so carried by the arm between the outer end and pivot thereof as to substantially conform to the motion of the latter only in the respect that the longitudinal axis of the straight end portion does not substantially shift in inclination relative to the arm, the normal free disposition of said stabilizer being such that the aforesaid portions substantially occupy a single horizontal plane in common, the body portion operating at all times when either end portion is individually canted in one vertical direction out of the free disposition plane to transmit substantially pure torsion force for application to the other end portion for resiliently urging the latter to duplicate the aforesaid canting action in said one vertical direction.

14. In combination, a vehicle structure comprising a load-carrying supported part having a longitudinal axis, and other parts supporting said load-carrying supported part disposed adjacent opposite sides of said load-carrying supported part, each supporting part including wheel-carrying means, a laterally extending arm, and a load-supporting spring intermediate said supported part and said arm, said arm having a reception portion disposed generally lengthwise of the arm and laterally thereof an articulated connection with said wheel-carrying means and being mounted to said supported part for rising and falling movement relative to the latter about a generally horizontal axis; an elongated resilient one-piece stabilizer bar of generally bow shape between its ends, extending generally transversely of said longitudinal axis of the supported part adjacent said supporting parts, said bar having a substantially straight midportion and a pair of lever-like legs offset from said midportion approximately at the places where the said axes of the arms when extended cross the said midportion, each leg comprising a length having a longitudinal axis and extending into registering juxtaposition with said lengthwise reception portion of the respective arm of the adjacent supporting part; and means mounting said bar to said structure whereby it is operable by torsional deflection to oppose relative rising and falling movement of said arms, said mounting means including resilient means and securing said lengths of the legs of said bar directly to said lengthwise reception portions of said arms for rising and falling movement with said arms yet accommodating rotative movement of said lengths about their longitudinal axes relative to the arms to which they are secured.

15. In combination, a vehicle structure comprising a load-carrying supported part having a longitudinal axis, and other parts supporting said load-carrying supported part disposed adjacent opposite sides of said load-carrying supported part, each supporting part including wheel-carrying means, a laterally extending arm, and a load-supporting spring intermediate said supported part and said arm, said arm having a reception portion disposed generally lengthwise of the arm and laterally thereof an articulated connection with said wheel-carrying means and being mounted to said supported part for rising and falling movement relative to the latter about a generally horizontal axis; an elongated resilient stabilizer of generally bow shape between its ends, extending generally transversely of said longitudinal axis of the supported part adjacent said supporting parts, said stabilizer having a substantially straight midportion and a pair of lever-like legs offset from said midportion approximately at the places where the said axes of the arms when extended cross the said midportion, each leg comprising a length having a longitudinal axis and extending into registering juxtaposition with said lengthwise reception portion of the respective arm of the adjacent supporting part, the longitudinal axis of said length passing adjacent the said generally horizontal axis of said arm of the said adjacent supported part; and means mounting said stabilizer to said structure whereby it is operable by torsional deflection to oppose relative rising and falling movement of said arms, said mounting means including resilient means and securing said lengths of the legs of said stabilizer directly to said lengthwise reception portions of said arms for rising and falling movement with said arms yet accommodating rotative movement of said lengths about their longitudinal axes relative to the arms to which they are secured.

16. In combination, a vehicle structure comprising a load-carrying supported part having a longitudinal axis, and other parts supporting said load-carrying supported part disposed adjacent opposite sides of said load-carrying supported part, each supporting part including a laterally extending arm member pivotally mounted at one of its ends to said supported part to provide for swinging movement of its other end about a generally horizontal axis extending generally longitudinally of said supported part, and a wheel-carrying member having an articulated connection with said other end of said arm member; an elongated resilient stabilizer of substantial bow shape between its ends, extending generally transversely of said longitudinal axis of the supported part, said stabilizer comprising a midportion and opposite end portions offset from said midportion and respectively disposed adjacent corresponding supporting parts; and means mounting said stabilizer to said supporting parts free from said supported part; said arms being arranged with their said swing axes disposed intermediate said mounting means and in a common plane, and said midportion of the stabilizer being operatively disposed in juxtaposition to the said plane; at least one of the aforesaid members of each supporting part being secured to its said adjacent offset portion of the stabilizer through said mounting means and said mounting means at said places of securement including core structure surrounding said stabilizer offset portion to accommodate relative rotation of said stabilizer with respect to the member to which it is secured, said stabilizer operating by torsional deflection to oppose relative rising and falling movement of said supporting parts.

17. In combination, a longitudinal vehicle frame, an individual wheel suspension disposed adjacent opposite sides of the frame, each suspension including a lateral arm connected to the frame for swinging movement about an axis lying substantially longitudinally of the frame, the axis of oscillation of one lateral arm being disposed in the horizontal plane containing the axis of oscillation of the other lateral arm, a one-piece resilient bar means extending transversely of the frame and comprising opposite lateral end portions respectively juxtaposed corresponding lateral arms of said opposite suspensions, first journal means connecting each lateral end portion to a first location on its corresponding juxtaposed arm adjacent the axis of oscillation thereof, and second journal means connecting each lateral end portion to a second location on its corresponding juxtaposed arm more remote from the axis of oscillation than said first journal means, said first and second locations being in predetermined transverse disalignment as respects said longitudinal frame and said bar means being free from any controlling connection with parts of the vehicle other than said lateral arms.

18. In a vehicle having a pair of laterally spaced wheels upon which an assembly is spring supported, a pair of arm members pivotally mounted upon sain assembly to swing up and down around substantially horizontal axes, each of said arm members extending from one wheel inwardly to its pivotal axis, and a generally U-shaped stabilizer bar extending transversely of said vehicle adjacent to said arm members, each end of said stabilizer bar being rotatably mounted upon the adjacent arm member by means of a pair of axially aligned bearings, the axis through each pair of said bearings extending diagonally at such angle that pivotal movement of the associated arm member rotates the adjacent end of said bar.

19. In a vehicle having a pair of laterally spaced wheels upon which a frame is spring supported, a pair of arm members pivotally mounted upon said frame to swing around horizontal axes, each of said arm members extending from one wheel inwardly to its pivotal axis, and a stabilizer bar extending transversely of said vehicle adjacent said arm members, said stabilizer bar having a straight central portion and opposite end portions extending generally diagonally with respect to said straight central portion, the junction between each of said generally diagonal end portions and said straight portion of the stabilizer bar being located substantially at the intersection of said bar with a vertical plane through the pivotal axis of the adjacent arm member, each of said end portions of the stabilizer bar being rotatably mounted upon the adjacent arm member.

20. In a vehicle having a pair of laterally spaced wheels upon which an assembly is spring supported, a pair of arm members pivotally mounted upon said assembly to swing up and down around substantially horizontal axes, each of said arm members extending from one wheel inwardly to its pivotal axis, and a stabilizer bar extending transversely of said vehicle adjacent said arm members, each end of said bar having a crank fixed thereon with the free end of each crank being rotatably connected to the adjacent arm by means of a pair of axially aligned bearings, the axis through each pair of said bearings extending diagonally at such angle that pivotal movement of the associated arm member rotates the adjacent end of said bar.

21. In a vehicle having a pair of laterally spaced wheels upon which a frame member is spring supported, a pair of arm members pivotally mounted upon said frame to swing around laterally spaced horizontally converging axes, each of said arm members extending from one wheel inwardly to its pivotal axis, and a generally U-shaped stabilizer bar extending transversely of said vehicle adjacent said arm members, each end of said stabilizer bar being rotatably mounted upon the adjacent arm member by means of a pair of axially aligned bearings, the axis through each pair of said bearings extending diagonally at such angle that pivotal movement of the associated arm member rotates the adjacent end of said bar.

22. In a vehicle having a pair of laterally spaced wheels upon which a frame member is spring supported, a pair of arm members pivotally mounted upon said frame to swing around laterally spaced rearwardly converging axes, each of said arm members extending from one wheel inwardly and forwardly to its pivotal axis, and a generally U-shaped stabilizer bar extending transversely of said vehicle in substantial vertical alignment with said arm members and spaced forwardly therefrom, each end of said stabilizer bar being rotatably mounted upon the adjacent arm member by means of a pair of axially aligned bearings, the axis through each pair of said bearings extending diagonally outwardly and rearwardly at such angle that pivotal movement of the associated arm member rotates the adjacent end of said bar.

23. In a vehicle having a pair of laterally spaced wheels upon which a frame is spring mounted, a pair of arm members pivotally mounted upon said frame to swing up and down around substantially horizontal axes, each of said arm members extending from one wheel inwardly to its pivotal axis, and a stabilizer bar extending transversely of said vehicle adjacent to said arm members, each end of said stabilizer bar being bent diagonally rearwardly, each of said diagonal ends being rotatably mounted on the adjacent arm member by means of a pair of axially aligned bearings, said diagonal ends being at such angle that the pivotal movement of the associated arm members rotates said bar.

24. In a vehicle having a pair of laterally spaced wheels upon which a frame is spring mounted, a pair of A-shaped members pivotally mounted upon said frame to swing up and down around substantially horizontal axes, each of said A members having its outer end connected to one of said wheels and its base mounted for rotation about one of said pivotal axes, and a generally U-shaped stabilizer bar extending transversely of said vehicle adjacent said A members, each end of said stabilizer bar having a crank associated therewith, the outer ends of each crank being rotatably mounted on the adjacent edge of the adjacent A member by means of a pair of axially aligned bearings, the axis through each pair of said bearings extending diagonally at such angle that pivotal movement of the associated A member rotates the adjacent crank arm.

25. In a vehicle having a pair of laterally spaced wheels upon which a frame member is spring supported, A-shaped arm members pivotally mounted upon said frame member, the axes of said pivotal mountings being substantially horizontal and rearwardly converging, and a generally U-shaped stabilizer bar extending transversely of said vehicle just forwardly of said A-shaped arm members, each end of said stabilizer bar being bent diagonally rearwardly so as to lie adjacent the side of one of said arm members, each of said diagonally extending ends being pivotally mounted upon the adjacent A member by means of a pair of laterally spaced bearings.

26. In a vehicle having a frame, a pair of road wheels on opposite sides of said frame, independent suspension members supporting road wheels at their outer ends and having their inner ends pivotally connected to said frame to permit rising and falling movement of the wheels, and a stabilizer bar extending transversely of the vehicle between said suspension members, each end portion of said stabilizer bar being rotatably connected to the adjacent suspension member at two points spaced unequal distances from the pivotal axis of said last-mentioned suspension member, one of said points of connection being located near the outer end of said suspension member and the other near the inner end thereof.

27. In a vehicle having a frame, a pair of road wheels on opposite sides of said frame, independent suspension members supporting road wheels at their outer ends and having their inner ends pivotally connected to said frame to permit rising and falling movement of the latter, and a stabilizer bar extending transversely of the vehicle between said suspension members, each end portion of said stabilizer bar being rotatably connected to the adjacent suspension member at two points, said two points of connection being spaced from each other both radially and axially of the pivotal axis of said last-mentioned suspension member.

28. In a vehicle having a frame, a pair of road wheels on opposite sides of said frame, independent suspension members supporting road wheels at their outer ends and having their inner ends pivotally connected to said frame to permit rising and falling movement of the wheels, and a stabilizer bar extending transversely of the vehicle between said suspension members, each end of said stabilizer bar being bent diagonally with respect to a line extending transversely of the vehicle, and each of said diagonal ends being rotatably mounted upon the adjacent suspension member for rotation substantially about the axis of that end portion, said stabilizer being entirely supported upon said suspension members independently of said frame, and said diagonal ends extending at such angle that pivotal movement of the suspension members rotates the bar.

29. In a vehicle having a pair of laterally spaced wheels upon which an assembly is spring supported, a pair of arm members pivotally mounted upon said assembly to swing up and down around substantially horizontal axes, each of said arm members extending from one wheel inwardly to its pivotal axis, and a generally U-shaped stabilizer bar extending transversely of said vehicle adjacent to said arm members, each end of said stabilizer bar being rotatably connected to the adjacent arm member by means of a pair of axially aligned bearings disposed between the axis of this member and its wheel, the axis through each pair of said bearings extending diagonally at such angle that pivotal movement of the associated arm member rotates the adjacent end of said bar.

30. In combination, a wheeled vehicle structure comprising a load-carrying supported part having a longitudinal axis and other parts supporting said load-carrying supported part disposed adjacent opposite sides of said load-carrying supported part, each supporting part comprising wheel-carrying suspension means including a laterally extending suspension member connected at one end to the load-carrying supported part for up and down swinging movement with respect thereto, each said suspension member extending from adjacent the wheel carried by its associated suspension means inwardly to its swing connection, an elongated resilient one-piece stabilizer bar of generally bow shape between its ends extending generally transversely of said longitudinal axis of the supported part and interconnecting said opposite supporting parts, said bar having a midportion and opposite end portions offset from said midportion, a pair of spaced-apart substantially coaxial deformable bearings embracing and securing one of said end portions of said bar to the suspension member of one of said supporting parts at locations intermediate its swing connection and adjacent wheel, and another pair of such bearing similarly located and embracing and securing the other of said end portions of said bar to the suspension member of the opposite supporting part, said bar being otherwise unconnected with the parts of the vehicle and the axis through each pair of said bearings extending diagonally at an angle to the midportion of said bar whereby swinging movement of the associated suspension member in a predetermined direction will swing the suspension member associated with the opposite end portion of said bar in the same general direction.

31. In combination, a wheeled vehicle structure comprising a load-carrying supported part having a longitudinal axis and other parts supporting said load-carrying supported part disposed adjacent opposite sides of said load-carrying supported part, each supporting part comprising wheel-carrying suspension means including a laterally extending suspension member connected at one end to the load-carrying supported part for up and down swinging movement with respect thereto about a longitudinally extending substantially horizontal axis, each said suspension member extending from adjacent the wheel carried by its associated suspension means inwardly to its swing axis and the swing axis of one of said members being disposed in the horizontal plane containing the swing axis of the other suspension member, an elongated resilient one-piece stabilizer bar of generally bow shape between its ends extending generally transversely of said longitudinal axis of the supported part and interconnecting said opposite supporting parts, said bar having a midportion and opposite end portions offset from said midportion at locations substantially at the intersection of said bar with vertical planes through the swing axes of said suspension members, a pair of spaced-apart substantially coaxial deformable bearings embracing and securing one of said end portions of said bar to the suspension member of one of said supporting parts at locations intermediate its swing axis and adjacent wheel, and another pair of such bearings similarly located and embracing and securing the other of said end portions of said bar to the suspension member of the opposite supporting part, said bar being otherwise unconnected with the parts of the vehicle and the axis through each pair of said bearings extending diagonally at an angle to the midportion of said bar whereby swinging movement of the associated suspension member in a predetermined direction will operate to effect swing of the suspension member associated with the opposite end portion of said bar in the same general direction.

HERMAN C. CUSKIE.

REFERENCES CITED

The following references are of record in the file of this patent:

UNITED STATES PATENTS

| Number | Name | Date |
|---|---|---|
| Re. 23,116 | Utz | May 24, 1949 |
| 2,254,325 | Slack et al. | Sept. 2, 1941 |
| 2,275,637 | McIntyre et al. | Mar. 10, 1942 |
| 2,483,974 | Hicks et al. | Oct. 4, 1949 |
| 2,497,459 | Leighton | Feb. 14, 1950 |
| 2,517,611 | Utz | Aug. 8, 1950 |
| 2,578,702 | Hellwig | Dec. 18, 1951 |

FOREIGN PATENTS

| Number | Country | Date |
|---|---|---|
| 879,169 | France | Nov. 10, 1942 |